United States Patent [19]

Köster

[11] Patent Number: 5,634,428
[45] Date of Patent: Jun. 3, 1997

[54] DEVICE FOR REMOVING A SET OF TEAT CUPS

[75] Inventor: Ludger Köster, Naperville, Ill.

[73] Assignee: Westfalia Separator AG, Oelde, Germany

[21] Appl. No.: 587,198

[22] Filed: Jan. 16, 1996

[30] Foreign Application Priority Data

Feb. 22, 1995 [DE] Germany .................. 195 06 138.1

[51] Int. Cl.⁶ ............................................. A01J 5/02
[52] U.S. Cl. .................................................. 119/14.1
[58] Field of Search ........................... 119/14.01, 14.02, 119/14.05, 14.08, 14.1, 14.13

[56] References Cited

U.S. PATENT DOCUMENTS

| | | | |
|---|---|---|---|
| 3,556,053 | 1/1971 | Padman et al. | 119/14.08 |
| 3,690,300 | 9/1972 | Tonelli | 119/14.08 |
| 4,034,713 | 7/1977 | Umbaugh | 119/14.08 |

FOREIGN PATENT DOCUMENTS

| | | | |
|---|---|---|---|
| 963130 | 2/1975 | Canada | 119/14.08 |
| 2554998 | 6/1976 | Germany | 119/14.08 |

Primary Examiner—Thomas Price
Attorney, Agent, or Firm—Sprung Horn Kramer & Woods

[57] ABSTRACT

A device for removing a set of teat cups from a dairy animal. The device includes a piston-and-cylinder mechanism. The cylinder is attached to the teat-cup set by a cord secured to the piston. The device is intended for use in a milking parlor where the teat cups are removed through the animal's hind legs after milking. The object is to prevent the milker from being impeded in his duties by the teat cups when they are not being used. The cord is provided with a guide that can be shifted by mechanical controls out of an active position wherein the cups can be removed along a vertical plane exactly between the animal's hind legs and into an inactive position horizontally remote therefrom and from the milker's head.

5 Claims, 4 Drawing Sheets

DEVICE FOR REMOVING A SET OF TEAT CUPS

BACKGROUND OF THE INVENTION

The present invention concerns a device for removing a set of teat cups from a dairy animal. The device includes a piston-and-cylinder mechanism. The cylinder is attached to the set by a cord secured to the piston.

A device of this type is known from German AS 2 262 129 for example. The cylinder is positioned above the animal, and the cord is in the active position while the equipment is in place. When milking is finished, the cylinder is activated and the set removed and suspended in a rest position below the cylinder. To keep the set away from the milker's head where it can interfere with pre-milking and post-milking care of the udder, the cylinder is usually mounted horizontally remote from that part of the animal. The accordingly slanting tug is practical, however, only in parlors where the set is applied from beside the animal instead of from behind.

In parallel-stall parlors the animals stand next to one another, and the teat cups must be introduced through their hind legs. Since there is very little room to move, the cord must remove the teat cups along a plane that extends between the hind legs and through the udder. The cylinder in the known device must accordingly be mounted behind the animal and accordingly in the vicinity of the milker's head, impeding him in the performance of his duties.

SUMMARY OF THE INVENTION

The object of the present invention is to improve the generic device to the extent that a milker working in a parallel-stall milking parlor will not be impeded in the performance of his duties.

This object is attained in accordance with the present invention in that the cord travels through a guide, whereby mechanical controls shift the guide out of the active position and into a relatively horizontal inactive position.

While the teat cups are being removed, the guide is positioned behind and at the animal's midplane, allowing the set to easily be removed between the hind legs. Once the cups have been removed, the controls immediately shift the guide into the horizontally displaced inactive position next to the animal's udder. The set will according be suspended out of the vicinity of the milker's head, and he can perform his duties unimpeded.

The controls in one advantageous embodiment of the present invention comprise a pivoting arm secured in the active position by a spring and with the cord guide at its free end. The cord can be provided with a stop that comes into contact with the guide and shifts it into the inactive position. The horizontally displaced inactive position is accordingly compulsorily established by a tug on the cord. When the cord is extracted for the next milking, the spring will return the arm to the active position.

The controls in another advantageous embodiment comprise a tube with a slot in the base. The guide slides back and forth in the slot, and the tube slants at an angle that automatically shifts the guide into the active position. The cord is again provided with a stop that comes into contact with the guide and shifts it into the inactive position. This embodiment does not need a spring to return the arm to the active position.

Another advantageous embodiment of the present invention is characterized by a compression spring in the tube. This spring forces the guide into the active position. The compression spring amplifies the force exerted by the slant of the tube.

The guide in another advantageous embodiment is provided with a bead and the stop with a groove that engages the bead when the stop comes into contact with the guide. This feature ensures that the stop will shift the guide into the active position as the cord is extracted. As the cord is extracted farther, the guide and the stop will separate automatically.

The guide in still another advantageous embodiment is mounted on the piston rod of another, horizontal, piston-and-cylinder mechanism that shifts the guide into the active position at one end of its stroke and into the inactive position at the other end. The second piston-and-cylinder mechanism and its synchronization with the extraction and retraction of the cord makes it possible to easily adjust the device to various situations.

Embodiments of the present invention will now be specified with reference to the accompanying drawing, wherein

DETAILED DESCRIPTION OF THE INVENTION

Figure 1:
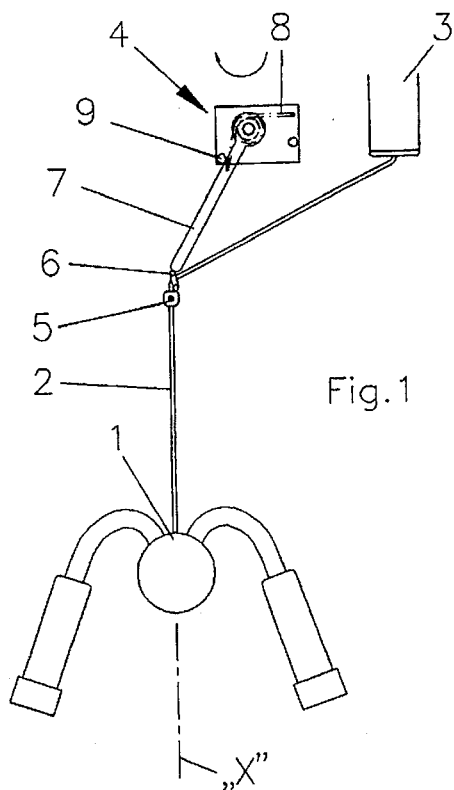
FIG. 1 illustrates a device with a pivoting arm in the active position.

The set 1 of teat cups illustrated in FIG. 1 is attached by a cord 2 to the unillustrated piston of a piston-and-cylinder mechanism 3. Cord 2 is maintained in an active position by mechanical controls 4. In this position cord 2 can be tugged in a direction extending within a plane extending in turn through the middle of the animal and represented by the line X in FIG. 1. Controls 4 comprise a cord-travel stop 5 on cord 2 and a cord guide 6 mounted on a pivoting arm 7. Arm 7 is maintained in the active position by a spring 8 and a pivoting-motion stop 9. Cord 2 is accordingly extracted along a plane exactly between the animal's hind legs without coming into contact with them.

Figure 2:
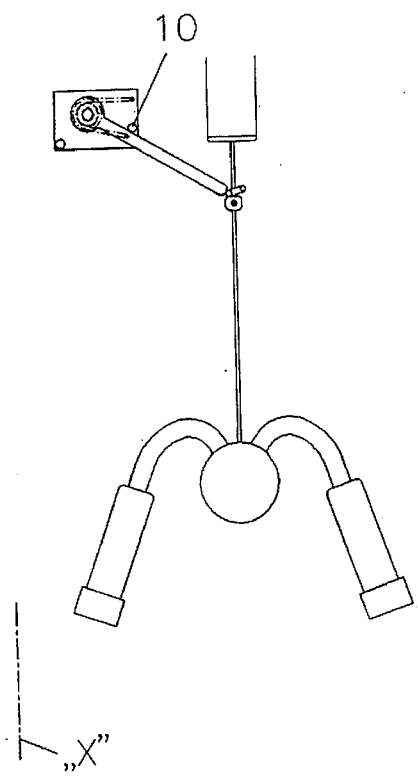
FIG. 2 the device illustrated in FIG. 1 in the inactive position.

When teat-cups set 1 is removed and cord-travel stop 5 comes into contact with cord guide 6, arm 7 is entrained, as cord 2 continues to travel, against the force of spring 8 and toward the inactive position illustrated in FIG. 2, wherein it is maintained by another pivoting-motion stop 10. Set 1 remains suspended in this position at a horizontal distance away from plane X defined by how far arm 7 can pivot. The distance should be long enough to prevent impediment to the milder providing pre-milking and post-milking care to the animal's udder in the vicinity of plane X.

Figure 3:
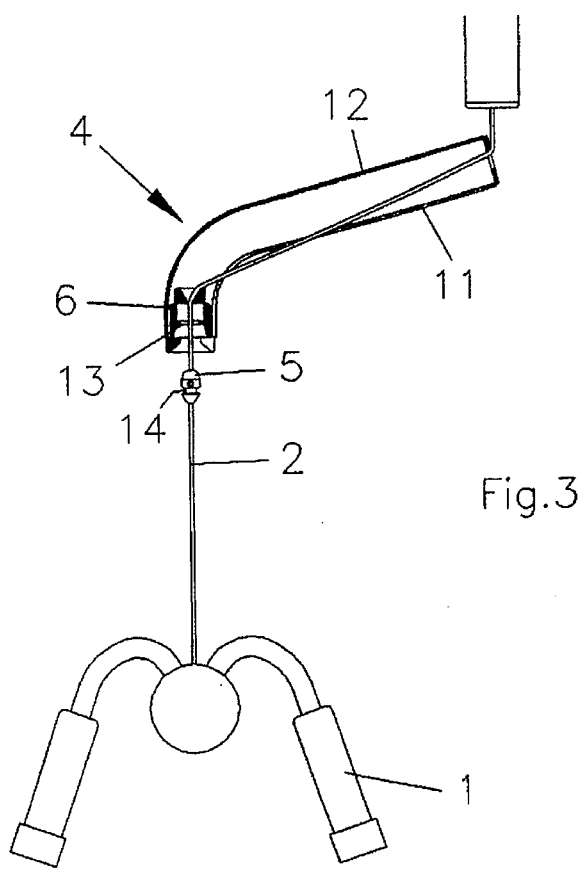
FIG. 3 a device with a slotted tube in the active position.
Figure 4:
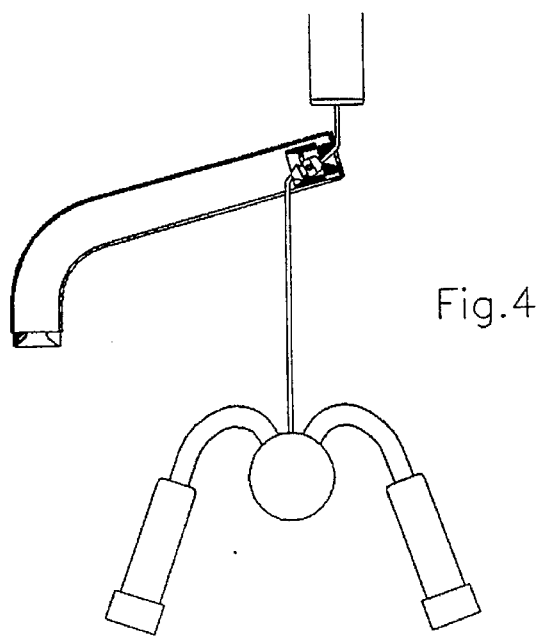
FIG. 4 the device illustrated in FIG. 3 in the inactive position.

The controls 4 in the embodiment illustrated in FIG. 3 comprise a tube 12 with a slot 11 in the base. Cord guide 6 travels back and forth in slot 11. Tube 12 is suspended at a slant that automatically shifts cord guide 6 into the active position as cord 2 is extracted. Cord guide 6 is provided with a bead 13, and cord-travel stop 5 with a groove 14. Groove 14 engages bead 13 as it arrives at cord guide 6 and shifts the guide into the inactive position illustrated in FIG. 4.

The vertical section of cord 2 between cord-travel stop 5 and teat-cups set 1 travels along the slot 11 in tube 12 during the aforesaid procedure. As cord 2 is extracted farther, the interlocking connection between groove 14 and bead 13 ensures that cord guide 6 will follow into the active position. As cord 2 is extracted even farther, cord guide 6 will automatic separate from cord-travel stop 5.

Tube 12 curves down in the vicinity of the active position, preventing premature shifting of the cord guide 6 due to friction as cord 2 is retracted.

Figure 5:
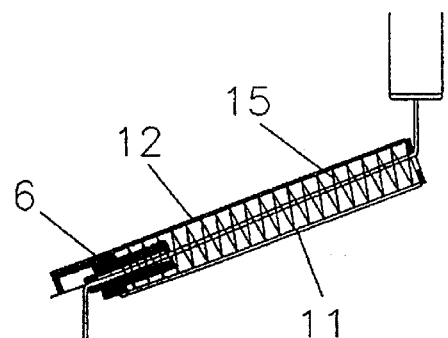
FIG. 5 a device with a slotted tube and another compression spring in the active position.
Figure 5:
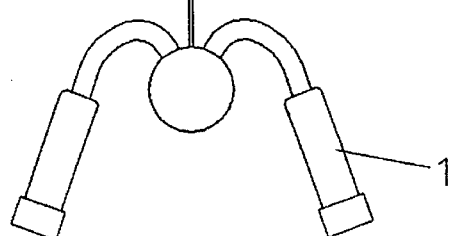
Figure 6:
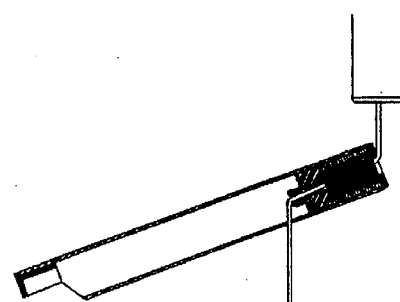
FIG. 6 the device illustrated in FIG. 5 in the inactive position.
Figure 6:
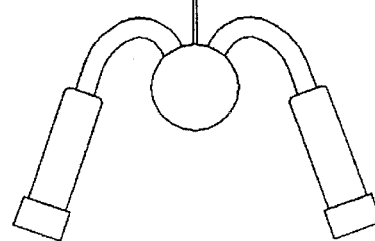

The design and operation of the embodiment illustrated in FIG. 5 are essentially like those of the device illustrated in FIG. 3. The shift of cord guide 6 out of the inactive position illustrated in FIG. 6 and into the active position is ensured by a compression spring 15 in tube 12.

Figure 7:
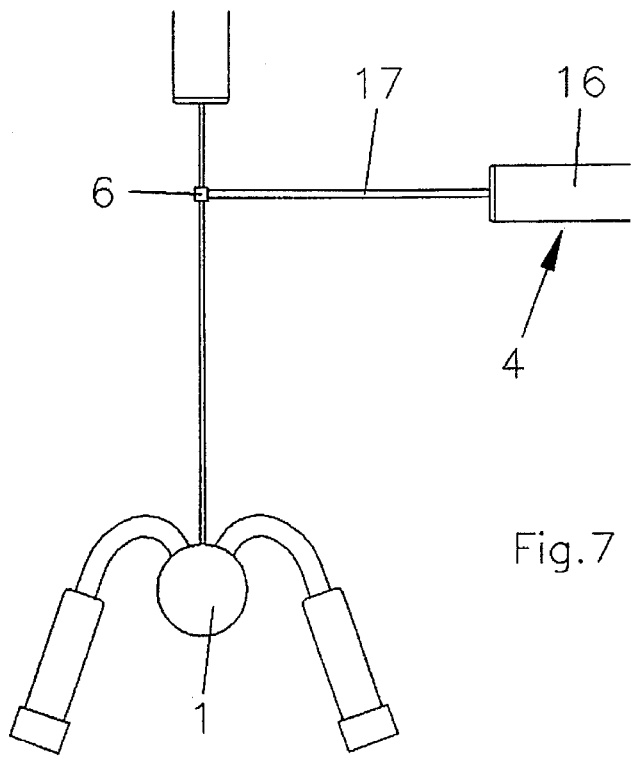
FIG. 7 a device with another piston-and-cylinder mechanism in the active position, and FIG. 8 the device illustrated in FIG. 7 in the inactive position.
Figure 8:
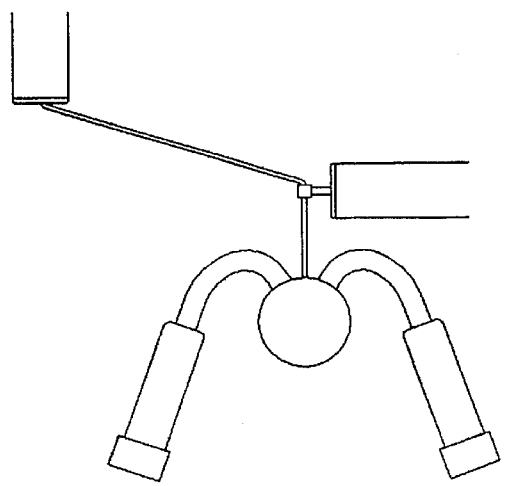

The controls 4 in the embodiment illustrated in FIG. 7 comprise another piston-and-cylinder mechanism 16. Mechanism 16 is horizontal, and cord guide 6 is mounted on its piston rod 17. Once set 1 of teat cups has been removed, the piston rod is retracted by piston-and-cylinder mechanism 16, shifting cord guide 6 into the inactive position illustrated in FIG. 8.

What is claimed is:

1. A device for removing a set of teat cups from a dairy animal comprising: a cord attachable to the teat cups; a piston and cylinder mechanism connected to the cord for pulling the cord; a guide moveable between an active position and an inactive position slidably receiving and guiding the cord between an active position and an inactive position horizontally displaced from the active position; and controls for moving the guide out of the active position and into the inactive position comprising a pivot arm connected to the guide for movement therewith, a spring biasing the pivot arm to maintain the guide in the active position and a stop connected to the cord for contacting the guide and moving same into the inactive position in response to the pulling of the cord.

2. A device for removing a set of teat cups from a dairy animal comprising: a cord attachable to the teat cups; a piston and cylinder mechanism connected to the cord for pulling the cord; a guide moveable between an active position and an inactive position slidably receiving and guiding the cord between an active position and an inactive position horizontally displaced from the active position; and controls for moving the guide out of the active position and into the inactive position comprising a tube with a slot in a bottom portion thereof and in which the guide is slidably mounted, wherein the tube slants at an angle to maintain the guide in the active position and a stop connected to the cord for contacting the guide and moving same into the inactive position in response to the pulling of the cord.

3. The device according to claim 2, further comprising a compression spring in the tube for biasing the guide into the active position.

4. The device according to claim 2, wherein the guide has a bead and the stop has a groove for engaging the bead when the stop contacts the guide.

5. A device for removing a set of teat cups from a dairy animal comprising: a cord attachable to the teat cups; a first piston and cylinder mechanism connected to the cord for pulling the cord; a guide moveable between an active position and an inactive position slidably receiving and guiding the cord between an active position and an inactive position horizontally displaced from the active position; and controls for moving the guide out of the active position and into the inactive position comprising a second piston and cylinder mechanism connected to the guide horizontally displacing the guide from the active position at one end of its stroke to the inactive position at the other end of its stroke.

* * * * *